US012452599B2

(12) United States Patent
Vuine

(10) Patent No.: US 12,452,599 B2
(45) Date of Patent: *Oct. 21, 2025

(54) LOUDSPEAKER ASSEMBLY FOR USE ON THE OUTSIDE OF A VEHICLE

(71) Applicant: PSS BELGIUM NV, Dendermonde (BE)

(72) Inventor: Fabian Vuine, Lebbeke (BE)

(73) Assignee: PSS BELGIUM NV, Dendermonde (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/566,866

(22) PCT Filed: Jun. 1, 2022

(86) PCT No.: PCT/EP2022/064971

§ 371 (c)(1),
(2) Date: Dec. 4, 2023

(87) PCT Pub. No.: WO2022/253924

PCT Pub. Date: Dec. 8, 2022

(65) Prior Publication Data

US 2024/0276151 A1 Aug. 15, 2024

(30) Foreign Application Priority Data

Jun. 4, 2021 (GB) .................................... 2108015

(51) Int. Cl.
*H04R 7/18* (2006.01)
*H04R 7/12* (2006.01)

(52) U.S. Cl.
CPC ................ *H04R 7/18* (2013.01); *H04R 7/12* (2013.01); *H04R 2307/025* (2013.01);
(Continued)

(58) Field of Classification Search
CPC ... H04R 7/18; H04R 7/12; H04R 7/16; H04R 7/24; H04R 2307/025; H04R 2307/029;
(Continued)

(56) References Cited

U.S. PATENT DOCUMENTS 3,862,376 A 1/1975 White
4,312,118 A 1/1982 Saik
(Continued)

FOREIGN PATENT DOCUMENTS

EP 2271137 A1 1/2011
EP 1515584 B1 8/2013
(Continued)

OTHER PUBLICATIONS

Anonymous: "Youngs Modulus: Tensile Elasticity Units, Factors Material Table", Omnexus, Jan. 1, 2022 (Jan. 1, 2022), pp. 1-13, XP055951047.
(Continued)

*Primary Examiner* — Ahmad F. Matar
*Assistant Examiner* — Sabrina Diaz
(74) *Attorney, Agent, or Firm* — NK Patent Law

(57) ABSTRACT

The present invention provides a loudspeaker assembly for use on the outside of a vehicle. The diaphragm and surround are formed of a single piece of material, the material comprising a single layer woven fabric of orthogonal, woven fibers and a thermoset resin.

19 Claims, 9 Drawing Sheets

(52) U.S. Cl.
CPC .. *H04R 2307/029* (2013.01); *H04R 2307/204* (2013.01); *H04R 2307/207* (2013.01); *H04R 2499/13* (2013.01)

(58) Field of Classification Search
CPC ........ H04R 2307/204; H04R 2307/207; H04R 2499/13; H04R 9/04; H04R 9/06; H04R 9/02; H04R 9/025; H04B 1/082
USPC ........................... 381/86, 177, 398, 423, 432
See application file for complete search history.

(56) References Cited

U.S. PATENT DOCUMENTS

| | | | | |
|---|---|---|---|---|
| 8,217,767 | B2 | 7/2012 | Nakayama | |
| 10,406,976 | B2 | 9/2019 | Bednar | |
| 2002/0061117 | A1 | 5/2002 | Takewa | |
| 2006/0249327 | A1 | 11/2006 | Sato | |
| 2008/0013781 | A1 | 1/2008 | Sagren | |
| 2012/0194328 | A1* | 8/2012 | Nakayama | B60Q 5/008 340/425.5 |
| 2013/0233640 | A1 | 9/2013 | Humphreys | |
| 2018/0220227 | A1 | 8/2018 | Tanabe | |
| 2019/0166445 | A1 | 5/2019 | Itano | |
| 2019/0200110 | A1 | 6/2019 | Kajihara | |
| 2020/0070719 | A1 | 3/2020 | Werner | |
| 2021/0385580 | A1 | 12/2021 | Kajiwara | |
| 2022/0248142 | A1 | 8/2022 | Gheldof | |
| 2022/0264226 | A1 | 8/2022 | Sunamoto et al. | |

FOREIGN PATENT DOCUMENTS

| | | | | | |
|---|---|---|---|---|---|
| FR | 2983025 | A1 | | 5/2013 | |
| GB | 1232089 | A | | 5/1971 | |
| GB | 1491080 | A | | 11/1977 | |
| GB | 2315185 | A | | 1/1998 | |
| JP | H02290400 | A | | 11/1990 | |
| JP | 06165289 | A | * | 6/1994 | H04R 31/00 |
| JP | 2010258537 | A | * | 11/2010 | H04R 7/12 |
| JP | 4855213 | B2 | | 1/2012 | |
| JP | 4898957 | B2 | | 3/2012 | |
| JP | 2013201484 | A | | 10/2013 | |
| WO | 2013141369 | A1 | | 9/2013 | |
| WO | WO-2013141373 | A1 | * | 9/2013 | H04R 7/18 |

OTHER PUBLICATIONS

ISA/EP, International Search Report and Written Opinion for corresponding PCT Patent Application No. PCT/EP2022/064971, mailed Sep. 2, 2022, 12 pages.

USPTO, Non-Final Office Action for corresponding U.S. Appl. No. 18/771,637 dated Sep. 10, 2024, 12 pages.

USPTO, Final Office Action for corresponding U.S. Appl. No. 18/771,637, dated Dec. 20, 2024, 13 pages.

USPTO; Non-final Office Action for corresponding U.S. Appl. No. 18/566,895, dated Jul. 8, 2025, 9 pages.

* cited by examiner

LOUDSPEAKER ASSEMBLY FOR USE ON THE OUTSIDE OF A VEHICLE

CROSS REFERENCE TO RELATED APPLICATIONS

This application is a U.S. National Stage Application of International Patent Application No. PCT/EP2022/064971 entitled "SPEAKER", filed Jun. 1, 2022, which claims priority to Great Britain Patent Application No. 2108015.5 entitled "SPEAKER", filed Jun. 4, 2021, the entire contents and elements of all of which are herein incorporated by reference for all purposes.

FIELD OF THE INVENTION

The present invention is generally related to the field of external sound generating devices for a vehicle. In particular, it is related to an acoustic vehicle warning system for outputting an acoustic warning signal.

BACKGROUND

Slow driving electric vehicles produce too little noise to be noticed by pedestrians. This clearly poses a safety issue, for example in front of schools, at pedestrian crossings or at traffic lights. Legislation has been adapted to address this matter by making mandatory the generation of an artificial sound. An Acoustic Vehicle Alerting System (AVAS) is designed to emit vehicle warning sounds and alert pedestrians to the presence of electric drive vehicles. These include hybrid (HEVs), plug-in hybrid (PHEVs), and full battery electric vehicles (BEVs) travelling at low speeds, especially in the lowest speed range below which the noise generated by rolling tires can no longer be easily heard.

A horn intended for producing a warning signal is installed in every vehicle. Horn signals have a typical sound that is automatically recognized by people as a horn. Worldwide people have grown accustomed to how vehicle horns sound, in spite of tonal differences that may be observed between horn sound signals.

In the art systems are known wherein the warning functionality of AVAS is combined with horn functionality. For example, U.S. Pat. No. 8,217,767 B2 discloses a vehicular horn device that can be used as a dynamic speaker so as to generate a false engine sound. The shortage of a low-pitched sound in a parametric speaker device is complemented with a false engine sound which the vehicular horn device generates. As the vehicle approaches a pedestrian, a sound tone of the false engine sound which the pedestrian hears changes, enabling the pedestrian to easily notice the approach or presence of the vehicle.

U.S. Pat. No. 10,406,976 B2 relates to a vehicle comprising a multi-purpose automotive sound device for alerting pedestrians. The sound device operates as a horn in a first mode in response to an external input (e.g. from the driver) and as a speaker or other sound generating device in a second mode in response to the vehicle moving in reverse or moving forwards at a speed satisfying a given threshold.

FR2983025 presents a system to generate external sound for use in electric motor vehicles. A hybrid transducer controlled by a common interface that assures distribution of power between a piezo-electric transducer and a magnetic transducer according to a required function, e.g. alarm function and sound warning function.

In US2020/070719 an acoustic vehicle warning system for a motor vehicle is disclosed. The system comprises at least one loudspeaker and a control unit designed to output a continuous acoustic signal by means of the loudspeaker during driving operation of the motor vehicle. Further, the control unit can actuate the loudspeaker after an actuation unit has been actuated, the loudspeaker being designed to output an acoustic warning signal after receiving the actuation signal.

Traditional loudspeakers make use of a diaphragm in the form of a cone, made from a rigid material, connected to a surround, made from a compliant/flexible material, that allows for the cone to easily move axially. The cone is provided with a central hole for connection to the voice coil former (it is thus an open cone). This hole is closed by gluing a rigid dust cap above the voice coil former onto the cone.

This approach has several disadvantages. To form the exposed front surface two connections must be made (diaphragm to surround; dust cap to diaphragm). This leads to inefficiency in the loudspeaker production process. Further, both connections pose a potential risk for water ingress in the application on the outside of a vehicle. It is therefore desirable to make the complete exposed front surface from a single piece of the same material that can be efficiently manufactured.

Connecting the voice coil to a flat, circumferentially clamped membrane does not lead to desired acoustic behavior. The effective acoustic radiating equivalent piston surface area of a membrane is small as the displacement decreases radially from maximum in the center, prescribed by the voice coil, down to zero at the clamped edge (see FIG. 1(*b*)) The modal behavior of the clamped membrane is not ideal either as a multitude of resonances occur already at low and medium frequencies in the rated frequency range of the loudspeaker.

To overcome this behavior the membrane is geometrically shaped. However there remains a need for speakers which also have desirable sound reproduction capabilities for various purposes.

Furthermore, state of the art cone loudspeakers may use a cone material with a Young's modulus in the range of 2 to 10 GPa. To allow for easy cone movement the connection between the cone and the frame is carried out by means of a compliant member, the surround. Surrounds are typically made from rubber, with a Young's modulus in the range of 2 to 10 MPa. Hence, the surround is approximately 1000 times more compliant than the cone. This allows for large excursions or movements of the stiff cone. Typically, the cone may move from its relaxed position 2 to 10 mm (that is, its position is the relaxed position ±2 to ±10 mm); in some cases it may be up to ±20 mm for automotive loudspeakers for effective radiation of low frequencies.

Typically a portion of the cone and a portion of the surround are glued on top of one another. This glue area typically expands over a radial distance of 3 to 4 mm for a strong and durable connection.

In this range, the specific mass of the membrane is often more than doubled, as the specific mass of the cone, the specific mass of the surround and the glue amount add up. For low moving mass designs, this additional annular mass loading is a relatively large penalty and decreases the loudspeaker's electroacoustic conversion efficiency. As the surround is substantially more compliant than the loudspeaker cone, the outside boundary condition of the cone can be regarded "free" as opposed to "hinged" or "clamped". This results in a low cone break-up, especially considering the aforementioned additional mass in the overlapping area at the outside of the cone and the moving part of the surround. The first cone break-up is characterized by a dip in the frequency response decreasing the efficiency and subsequent rugged frequency response which leads to part-to-part variation and colored sound.

The normal loudspeaker size for the AVAS application is about 50 to 170 mm in diameter. The free air resonance frequency of such loudspeakers is typically in the range of 50 to 150 Hz. A cavity behind the loudspeaker membrane increases the resonance frequency but this increase is dependent on the pressure, temperature and humidity of the enclosed air. For a loudspeaker intended for the use on the outside of a vehicle these factors must not be neglected. Typically, otherwise sealed loudspeaker boxes are equipped with a slow reacting valve that allows for ambient pressure equalization by means of air exchange between the inside and outside of the box.

Hence, due to the high compliance of the loudspeaker suspension and the varying stiffness of the air volume, the axial voice coil rest position in the air-gap is not as well defined as one might assume based on experience from classic in-cabin automotive loudspeakers or even home audio loudspeakers. Axial offset of the voice coil relative to the airgap center decreases the efficiency and generates distortion.

It is therefore desirable to have a broadband loudspeaker with a smooth frequency response in the rated frequency range of 350 Hz to 3.5 kHz, a relatively low moving mass, a front surface capable of withstanding the elements and low axial compliance suspension.

SUMMARY OF THE INVENTION

The present inventors have found that, by carefully controlling the material and shape of the parts of the loudspeaker, a desirable performance can be obtained.

The legally required, combined, A-weighted SPL (sound pressure level) of a vehicle alerting system in the $1/3^{rd}$ octave frequency bands 2 khz, 2.5 kHz and 3.15 kHz must be no less than 105 dB measured under anechoic conditions in 2 m distance on the principle axis of the device. See, for example, Regulation No 28 of the Economic Commission for Europe of the United Nations (UN/ECE)—"Uniform provisions concerning the approval of audible warning devices and of motor vehicles with regard to their audible signals."

High SPL in this region is a necessary but not sufficient condition to also recognize the sound as being that of a car horn. Traditional high-quality car horns come in pairs: Each of the two horns is equipped with a hammer knocking on a metal disk leaving it to resonate. The hammer or the disc itself is moved by means of electromagnetism in a fixed manner since the frequency of the hammer or disc movements is defined by an electromechanical interruption process. Direct current from the vehicle battery, e.g. 12V battery, is fed into a coil. The hammer moves towards the disc or vice versa. By moving forward, the contact with the battery is interrupted and after hitting the disc the contact is restored and the cycle starts again. The resonating disc radiates sound into a cavity which is open to a horn throat. The sound enters the horn throat, travels along the horn and exits via the horn mouth to the outside world. The well-known impedance matching of the horn to the surrounding air leads to high efficiency and gain increase of the harmonics of the resonating disc. Both the fundamental and the overtones of the two horns are tuned differently interleaving the spectra and resulting in an overall broad band output spectrum (see FIG. 2).

Hence, a loudspeaker designed for use as a car-horn playing a horn-like sound from a sound library is required to output sound at high sound pressure levels.

The present inventors have found that in particular, a piston-like movement of the diaphragm can be largely maintained, even in a speaker for outside use such as in an AVAS system, and produce the required sound profile for such a purpose. This is facilitated by the use, as described herein, of a particular surround (suspension) part.

Such piston-like movement is schematically illustrated in FIG. 1(*a*). Here, a schematic diagram shows a speaker diaphragm 3 which moves between a first, relaxed, position (solid line) and a second, actuated, position (dotted line). This motion, in a direction 5 along a movement axis 4, is piston-like in that the diaphragm 3 moves 'in phase': each part of the diaphragm 3 moves, as near as possible, the same amount as each other part of the diaphragm 3. This includes, for example, a dust cap 9. The surround 7 facilitates this motion; the properties of that surround and the diaphragm are a focus of the present invention.

This contrasts with the motion shown in FIG. 1(*b*), which is observed for more membrane-like speaker designs. Here it can be seen (solid line and dotted line) that the membrane motion is not piston-like: the membrane flexes and bends between its relaxed and actuated positions, bowing outward in its movement.

A first aspect of the present invention relates to a loudspeaker assembly for use outdoors, and in particular on the outside of a vehicle, the loudspeaker assembly including: a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis; wherein the loudspeaker assembly includes a frame from which the diaphragm is suspended by at least one suspension; wherein the at least one suspension includes a surround which is located at the perimeter of the diaphragm; and wherein the diaphragm and surround are formed of a single piece of material, the material comprising a single layer woven fabric of orthogonal, woven fibers and a thermoset resin. In some embodiments the longest dimension of the surround and diaphragm unit in a direction perpendicular to the movement axis is D_clamp and is in the range 50 to 200 mm. In some preferred embodiments, a Young's modulus of the material of the diaphragm and the surround is in the range 2 to 15 GPa, or even 8 to 15 GPa. In some preferred embodiments, the thickness of the material of the diaphragm and the surround is in the range 0.03 to 1 mm, for example 0.03 to 0.6 mm.

Such a loudspeaker assembly configuration allows for piston-like movement of the diaphragm and desirable sound output.

D_clamp corresponds to the longest dimension of the surround and diaphragm unit in a direction perpendicular to the movement axis. In particular, the surround and diaphragm may be formed unitarily with further material, which extends radially beyond the surround. Such material may be used to fixing the diaphragm and surround to, for example, a frame. This material is not included in D_clamp. For example, where the outer periphery of a substantially circular surround is to be fixed by circumferential clamping, D_clamp extends across the diameter of the surround from one clamped edge to the other. D_clamp does not include the clamped material, only the material that is able to move.

Therefore the outside edge boundary condition of the surround can be said to be clamped.

The present invention provides loudspeakers with a relatively large axial stiffness and relatively low moving mass. This can lead to them having a high resonance frequency. Typical values for embodiments in which D_clamp is in the range of 100 mm to 150 mm are within the octave of 400 Hz to 800 Hz.

Such a high resonance frequency is, in the special application as a HAVAS loudspeaker, especially useful: the resonance frequency may be tuned to the frequency range where the fundamentals of the horns lie (typically 400 to 600 Hz), decreasing the real power at the speaker in this range due to the impedance peak around resonance. Despite the high resonance frequency, the output at lower frequencies such as the 315 Hz ⅓$^{rd}$ octave band is still substantial due to the high loudspeaker sensitivity (see FIG. 4).

In speakers of the present invention, even at 6V the total harmonic distortion remains below 10% for low frequencies (see FIG. 5).

This allows the present loudspeakers to be used not only as vehicle warning horns but also as AVAS loudspeakers having to reproduce frequencies below its resonance frequency.

A loudspeaker assembly for use outdoors is intended to refer to a loudspeaker assembly suitable for use (preferably configured for use) with at least part of the loudspeaker assembly exposed to the open air, i.e. not inside a shelter, vehicle or building; for example, on the outside of a vehicle.

Accordingly, the frame may be in the form of a box which is acoustically sealed except for the loudspeaker or diaphragm covering one side of it.

The thickness of the material of the diaphragm and surround may suitably be in the range 0.03 to 0.6 mm, preferably 0.05 to 0.3 mm, and more preferably in the range 0.1 to 0.2 mm.

It will be recognised that the thickness of the material corresponds to its smallest dimension, which may be broadly in the direction parallel to the movement axis (dependent on shape).

The Young's modulus of the material of the diaphragm and surround is also found to be a relevant factor in optimising piston-like movement, in combination with the other factors considered here. For the speakers of the present invention, the Young's modulus of the material of the diaphragm and surround may suitably be in the range 2 to 15 GPa, preferably in the range 8 to 15 GPa and more preferably in the range 10 to 12 GPa. However, for many materials (for example where woven fibers are included), the Young's modulus may vary depending on the direction of measurement. Accordingly in some embodiments that material has the Young's modulus mentioned above in at least one direction; and in some embodiments in all directions.

In a woven material, the Young's modulus and tensile strength of the diaphragm material for a loudspeaker of the present invention may for example be determined by measurements according to ISO 527-1 from cut samples of the rectangular size 30 mm×5.3 mm of the manufactured diaphragm. A first sample cut with warp and weft aligning with the cut direction and a second sample cut with warp and weft at 45° relative to the cut direction.

The Young's modulus of the first cut sample where warp and weft are parallel to the edges of the rectangular sample (that is, the Young's modulus in the warp/wft direction) is preferably in the range of 2 GPa to 15 GPa, more preferably in the range of 3 GPa to 10 GPa, more preferably in the range of 3 Gpa to 8 GPa. The ultimate tensile strength is suitably in the range of 75 MPa to 300 MPa, preferably in the range 100 MPa to 250 MPa, more preferably in the range of 175 MPa to 225 Mpa.

The Young's modulus of the second cut sample where warp and weft are at an angle of 45° relative to the edges of the rectangular sample (that is, the Young's modulus at 45° to the warp/weft direction) is suitably be in the range 2 GPa to 10 GPa, preferably in the range 3 GPa to 8 GPa. The ultimate tensile strength shall be in the range 50 MPa to 200 MPa, preferably in the range 50 MPa to 75 MPa.

The elongation at break for any sample is suitably no more than 40% strain, preferably no more than 20% strain, more preferably no more than 10% strain.

Furthermore, when subject to a Differential Scanning Caliometry test according to ISO1137-1, the most suitable materials are thermally stable with a substantially flat DSC curve over a temperature range of −40° C. to 300° C. Ideally there shall be no condition change indicating melting, crystallization or glass transition.

When subject to Dynamical Mechanical Analysis according to ISO 6721-4, the Storage Modulus E' of any sample of a suitable material is suitably substantially stable over a temperature range from −40° C. to 100° C. At room temperature the Storage Modulus is suitably in the range of 2 GPa to 10 GPa, preferably in the range of 4 GPa to 6 GPa. The Loss Modulus E" at room temperature is suitably no more than 1 GPa, preferably no more than 500 MPa, more preferably no more than 200 MPa.

Suitable materials for the diaphragm and surround include materials comprising a single layer woven fabric of orthogonal, woven fibers such as glass fiber, carbon fiber or polyparaphenylene terephthalamide (Kevlar) and a matrix or coating of thermoset resin such as epoxy or phenolic resin.

Of that woven fabric, the weaving pattern is preferably a canvas or twill, and may suitably use the same thread count for the warp and the weft. That thread count may be, for example, 20-100 threads per inch (tpi), and preferably is 30-60 tpi.

The material of the diaphragm and surround may suitably have a specific mass in the range 50 g/m$^2$ to 500 g/m$^2$, and it may preferably be in the range 100 g/m$^2$ to 300 g/m$^2$. Moreover, it may suitably have a bulk density in the range 1.2 g/cm$^3$ to 1.8 g/cm$^3$, and preferably 1.4 g/cm$^3$ to 1.6 g/cm$^3$.

These properties help further provide a diaphragm and surround material which has enough stiffness to permit piston-like movement of the diaphragm (retaining its shape in motion) with flexibility to allow the surround portion to facilitate such piston-like movement.

It will be apparent that, while the diaphragm and surround are made of a single piece of material (that is, are unitary), there may be some manufacturing variation in properties of that material across the diaphragm and surround. Preferably the material has a substantially uniform or homogenous thickness and Young's modulus.

The diaphragm may have a dished shape. For example, the diaphragm may include a cone-shaped portion which is substantially in the shape of an open cone and has a cone opening angle in the range 60° to 160°. As an open cone, this means what would be the 'tip' of the cone is missing. Accordingly the cone opening angle is measured as the angle between the side walls of the cone-shaped portion. Preferably the cone opening angle is in the range 90° to 130°. It will be recognised that preferably those side walls of the cone-shaped portion are straight/flat; that is, that the cone angle does not vary in the radial direction.

The cone-shaped portion may have a longest dimension in a direction perpendicular to the movement axis D_cone in the range 40 mm to 180 mm.

The drive unit of the loudspeaker may comprise a voice coil positioned at the tip of the open cone of the cone-shaped portion. Where such a voice coil is present, it may ideally have a longest dimension D_VC in a direction perpendicular to the movement axis, wherein D_VC is in the range 18 to 50 mm and the ratio of D_clamp to D_VC is 2 or more. D_VC may preferably be in the range 25 to 40 mm.

The diaphragm may have a shaped portion which is adapted to engage the voice coil. For example, in a cone shaped diaphragm there may be a shoulder or indentation in the conical portion, at a position corresponding to where the voice coil will engage the diaphragm (in general terms, at D_VC). This shoulder or indentation may be annular, or another shape to match the voice coil (or at least the shape of the part of the voice coil that will engage the diaphragm). This allows for easier positioning of the voice coil, and easier adhesion/bonding/connection of it to the diaphragm as the shoulder/indentation acts as a siting or guiding portion.

The diaphragm may further comprise a dust cap portion on the front face of the diaphragm covering the tip of the open cone of the cone-shaped portion. The dust cap is in such cases made from the same material as the surround and diaphragm, and is generally unitary with them, i.e. formed from the same single piece of material (and thus subject to the above mentioned preferences and features of that material).

The surround may suitably comprise a corrugation which extends around the perimeter of the diaphragm; the centre of that surround corrugation having a longest dimension D_d in a direction perpendicular to the movement axis measured between points at the peak of the corrugation in the forwards direction (that is, the most forward point), the ratio of D_d to D_clamp being 0.8 or more. The corrugation may be convex (that is, with respect to the forward direction, the edges of the corrugation are not as far forwards as the middle of the corrugation) or concave (that is, with respect to the forward direction, the edges of the corrugation are further forward than the middle of the corrugation). Preferably the corrugation is convex with respect to the forward direction. The corrugation may preferably have a curved cross section (in a section parallel to the movement axis), in particular a curve that is a section of a circle, and be tangentially connected to the radially adjacent feature, for example here the diaphragm. That is, the connection of the corrugation to the diaphragm is at a point where the wall of the diaphragm (such as the side wall of the cone shaped portion discussed above) is in a direction tangential to the theoretical circle of which the curved corrugation is a section. This affords a smooth transition between the corrugation and the diaphragm.

The distances corresponding to D_clamp, D_d, D_cone and D_VC in one embodiment are illustrated schematically in FIG. 3.

During operation at low and medium frequencies (e.g. 2 kHz), the membrane movement can be regarded as being fundamentally that of a piston up to the diameter D_d and S_d according to (https://www.klippel.de/fileadmin/klippel/Files/Know_How/Application_Notes/AN_32_Effective_Radiation_Area.pdf). From the diameter D_d the loudspeaker parameter S_d is calculated. The ratio of D_d over D_clamp is no less than 0.8.

The surround may in some embodiments comprise multiple such corrugations. For example, it may comprise at least a first corrugation and a second corrugation which extend around the perimeter of the diaphragm, wherein the first corrugation is located radially outwards of the second corrugation. The first corrugation may preferably be convex with respect to the forward direction and the second corrugation may preferably be concave with respect to the forward direction.

Of course it can be envisaged that more than two corrugations are present. Each may independently be convex or concave with respect to the forward direction. Preferably, there is a convex corrugation at the radial extremity of the surround. Preferably the corrugations alternate between convex and concave.

Each may also independently have a curved cross section (in a section parallel to the movement axis), in particular a curve that is a section of a circle, and be tangentially connected to the radially adjacent feature, whether that is the diaphragm or another corrugation. That is, the connection of the corrugation to the adjacent feature is at a point where the wall of the diaphragm (such as the side wall of the cone shaped portion discussed above) or the curve of the adjacent corrugation is in a direction tangential to the theoretical circle of which the corrugation is a section. This affords a smooth transition between the corrugations, and between the innermost corrugation and the diaphragm.

It will be recognised that the transition between the outermost corrugation and any feature radially outward of it does not need to have this relationship and hence is not necessarily 'smooth' in this way.

For example there may be a third corrugation, between the above mentioned second corrugation and the diaphragm. That is, the surround may comprise at least a first corrugation, a second corrugation and a third corrugation, each of which extend around the perimeter of the diaphragm, wherein the first corrugation is located radially outwards of the second corrugation and the second corrugation is located radially outwards of the third corrugation. The first corrugation may preferably be convex with respect to the forward direction, the second corrugation may preferably be concave with respect to the forward direction, and the third corrugation may preferably be convex with respect to the forward direction.

Such corrugations in the surround allow for axial movement of the diaphragm along the movement axis. By way of the present invention, that movement can be piston-like (that is, pistonic) such that each part of the diaphragm moves in phase (that is, moves the same amount along the movement axis as every other part of the diaphragm; see FIG. 1(*a*)).

The loudspeaker assembly, for example the diaphragm, surround, and driver, may be configured such that the extent of movement of the diaphragm along the movement axis, when the loudspeaker assembly is in use, is small. For example, the maximum displacement of the diaphragm (one extremity of movement to the other) may be at most 2 mm. This may be, for example, the resting position of the diaphragm ± at most 1 mm, more preferably ± at most 0.5 mm.

The surround may in some embodiments include a mounting portion at the perimeter of the surround, wherein the surround is attached onto the frame via the mounting portion. The mounting portion may be a flat annular portion around the perimeter of the surround. Generally it is formed as a unitary part of the surround. It may be attached to the frame by means such as an adhesive, or physically/mechanically held in place by, for example, a fixing member placed to sandwich the mounting portion between the fixing member and the frame.

Alternatively, the surround and thus the loudspeaker may be fixed in place within the frame, by the presence of a fixing (for example adhesive) member or members located between the surround and the frame. That is, the loudspeaker may comprise a fixing member positioned between the surround and the frame and sized to fix and hold the loudspeaker within the frame. The fixing member is in this way sandwiched between the frame and the surround. The fixing member contacts the surround and the frame, allowing the desired movement of the diaphragm. Such an arrangement may be preferred instead of a flat annular mounting portion, as mentioned above, as the loudspeaker assembly can be made smaller for a given D_clamp; that is, a larger diaphragm can be fitted in a given frame size.

Due to the fixing member, generally the outside boundary condition of the surround is 'clamped'; that is, no movement of it is permitted. This means that the break-up region occurs above the rated frequency range and leads to a smooth response within the rated frequency range.

The break-up region is well understood in the art; it occurs where the primarily piston-like movement of the diaphragm breaks up. Already at low frequencies there are other modes excited and superimposed on top of the forced, axial motion. However, these modes are circumferential so similar sized portions of the cone move more whereas others move less and the resulting sound pressure level is hardly influenced. However, radial modal behaviour has a strong influence on the radiated sound pressure level as the areas of increased or decreased motion are not uniform in size. This leads to a dip and subsequent peaks in the frequency response—this is the break-up. The radial modal behaviour is determined by the material and shape but also the boundary condition.

Viewed from a direction along the movement axis, viewing towards the front face of the diaphragm, the loudspeaker assembly may be circular. In particular the shape of the surround may be circular; the shape of the perimeter of the diaphragm may also be circular.

In such a case, D_clamp, D_VC, D_cone and D_d each correspond to a diameter of the relevant circle.

In order for the loudspeaker assembly to be more suitable for outdoor use, it may further comprise a grille positioned in front of the front face of the diaphragm, with a rear face of the grille facing in the rearwards direction toward the front face of the diaphragm, and with a front face of the grille facing in the forwards direction; wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the diaphragm.

The loudspeaker assembly may preferably be configured for use in a road vehicle with the front face of the grille exposed to an outdoor environment. It may form part of an Acoustic Vehicle Alerting System (AVAS), or an Audible Warning Device (horn).

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
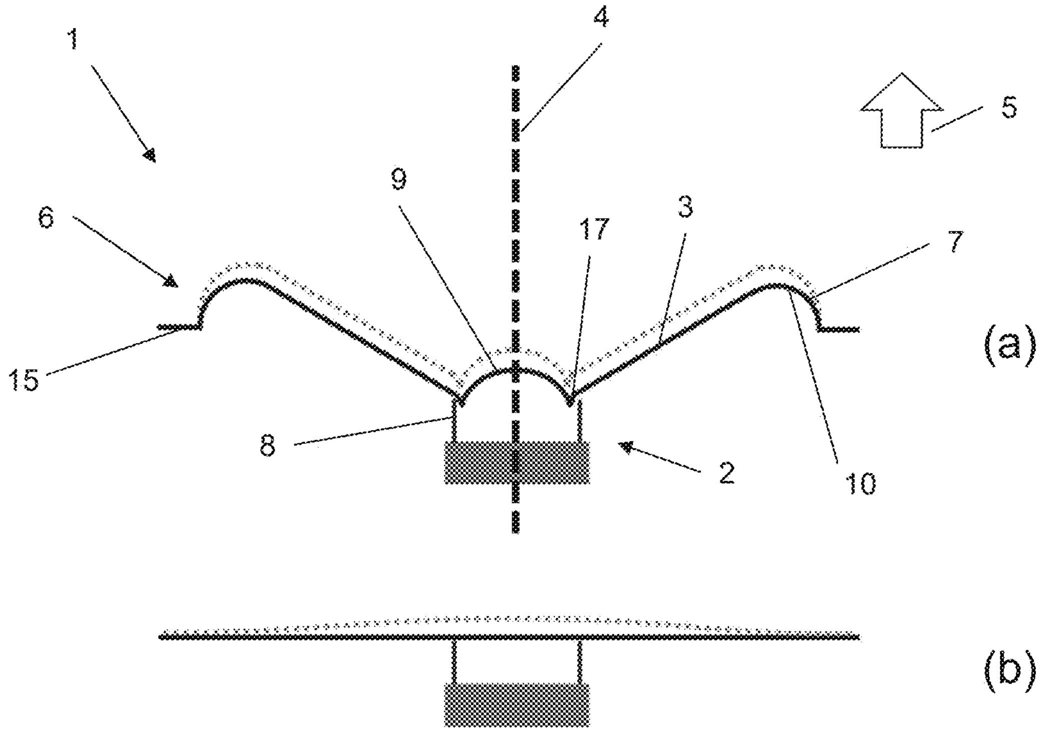
FIG. 1 shows (a) piston-like movement of a cone shaped diaphragm relaxed (solid line) and actuated (dotted line); and (b) the non-piston-like, and uneven, movement of a flat membrane related (solid line) and actuated (dotted line).
Figure 2:
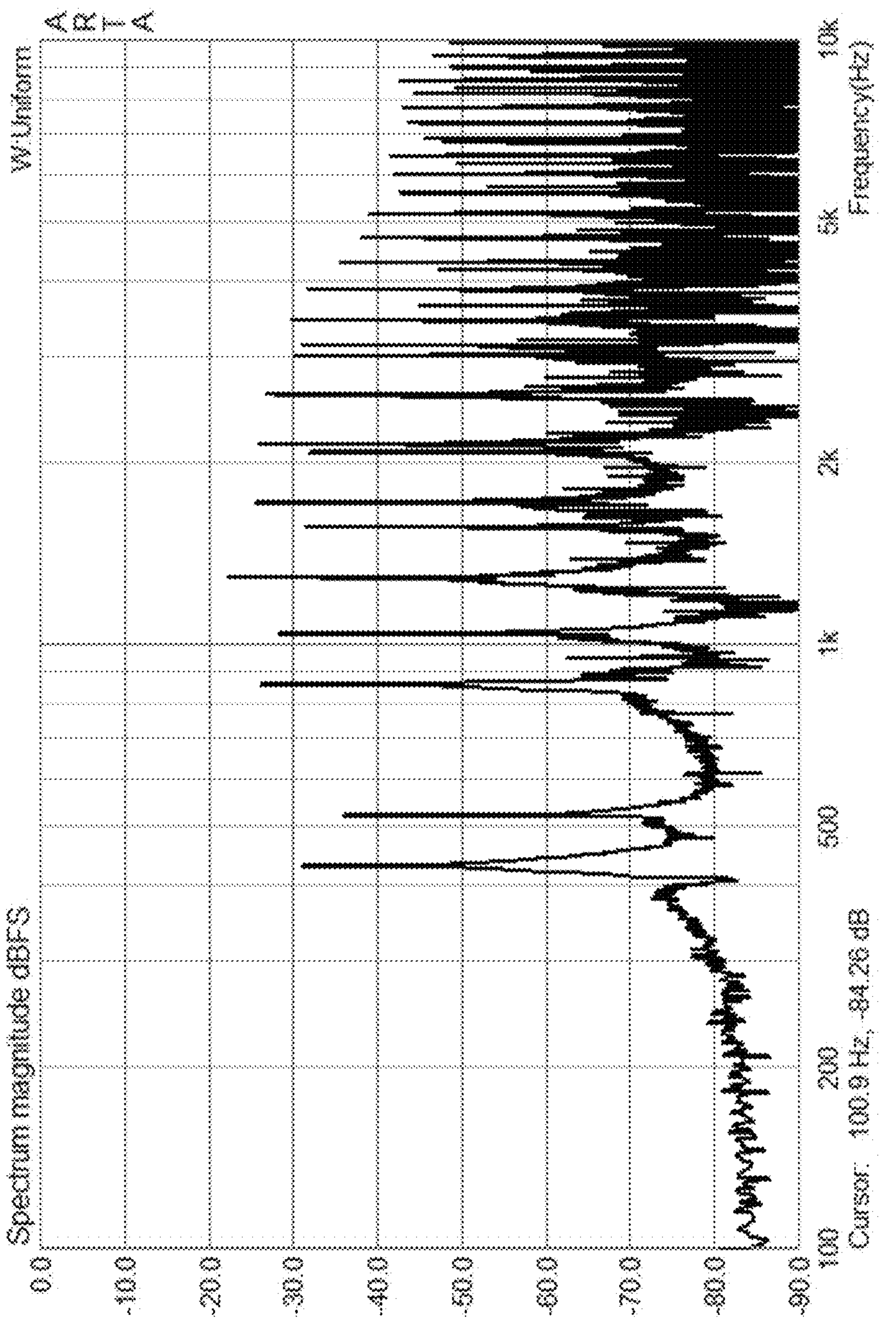
FIG. 2 shows the output spectrum of a traditional two-horn vehicle alerting system.
Figure 3:
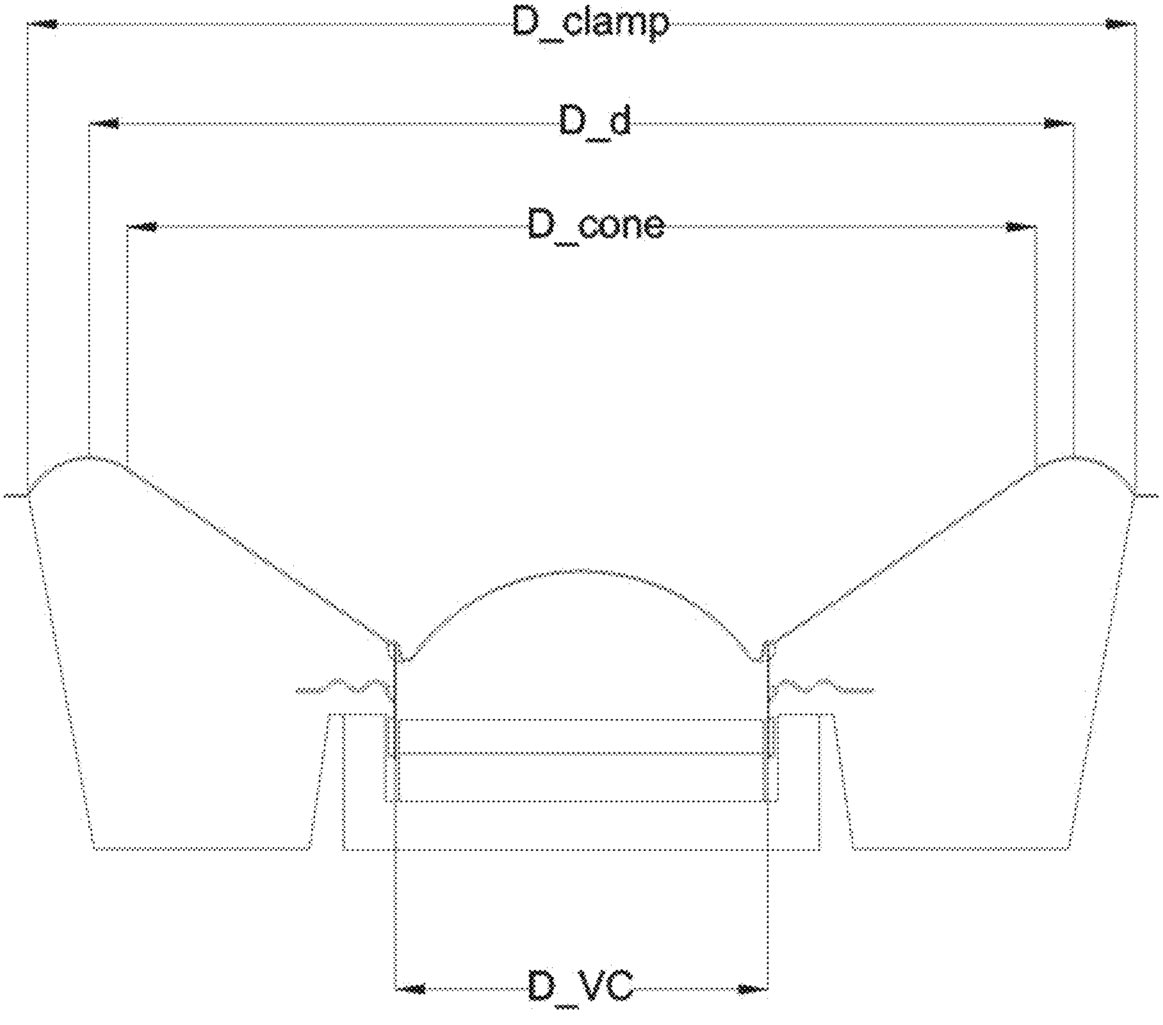
FIG. 3 shows a schematic cross-sectional view of a loudspeaker assembly of the present invention, with the various longest dimensions mentioned herein labelled.

FIG. 1 schematically illustrates the overarching concept of the present invention. FIG. 1(*b*) shows a simple membrane formed from a homogenous material (solid line) which moves when actuated to the dotted line position. The membrane bends, changing shape and affecting its response. These are disadvantageous speaker behaviours.

FIG. 1(*a*), on the other hand, shows the speaker motion enabled by the present invention. A loudspeaker assembly 1 is schematically illustrated. Here, the part corresponding to the homogenous membrane is the broadly conical (open cone)-shaped diaphragm 3, which is bounded by a surround 7 and has a dust cap 9 integrally formed at its centre. The dust cap stops dust, particles and other matter from getting into the voice coil former and entering the voice coil region.

Below mentions are made to the circumferential location of parts with respect to the diaphragm; of course, which might imply that the word applies only where the diaphragm is frustoconical. That is not the case. It will be appreciated that the diaphragm may have a different shape such that its perimeter is not circular. In that case, the skilled person can recognise that 'circumferential' means the outer perimeter of the diaphragm; the outer circumferential direction being that outwards from the centre of the diaphragm no matter its perimeter shape.

Similarly, where parts are described as annular it will be appreciated that where the diaphragm is of a different shape those parts will not be annular but will have a shape to match the perimeter of the diaphragm.

When actuated by the drive unit 2, which includes a voice coil 8, the diaphragm and dust cap move to the dotted line position, together and in phase: this is piston-like movement as described herein. The surround 7, which here comprises a corrugation 10, a curved part of the diaphragm material which connects the diaphragm part to a flat annular mounting portion 15, flexes to permit this piston-like motion. The surround is part of a suspension 6, which broadly links the diaphragm 3 to a frame (not illustrated in FIG. 1(*a*); later the numeral 14 is used).

The piston-like movement occurs in a movement axis 4, with actuation of the voice coil and hence the diaphragm 3 moving it in what is herein referred to as a forwards direction, indicated by the arrow 5. Of course it will be appreciated that there will be some slight non-linear or deviated motion of the diaphragm during actuation; the axis 4 and direction 5 are merely indicative of the primary motion.

It can be seen that, at the point where the voice coil 8 meets the diaphragm 3, there is an annular notch/ledge 17 in the shape of the diaphragm. This lies between the diaphragm 3 and the dust cap 9. It permits easier placement and location of the voice coil 8 during manufacturing.

Figure 7:
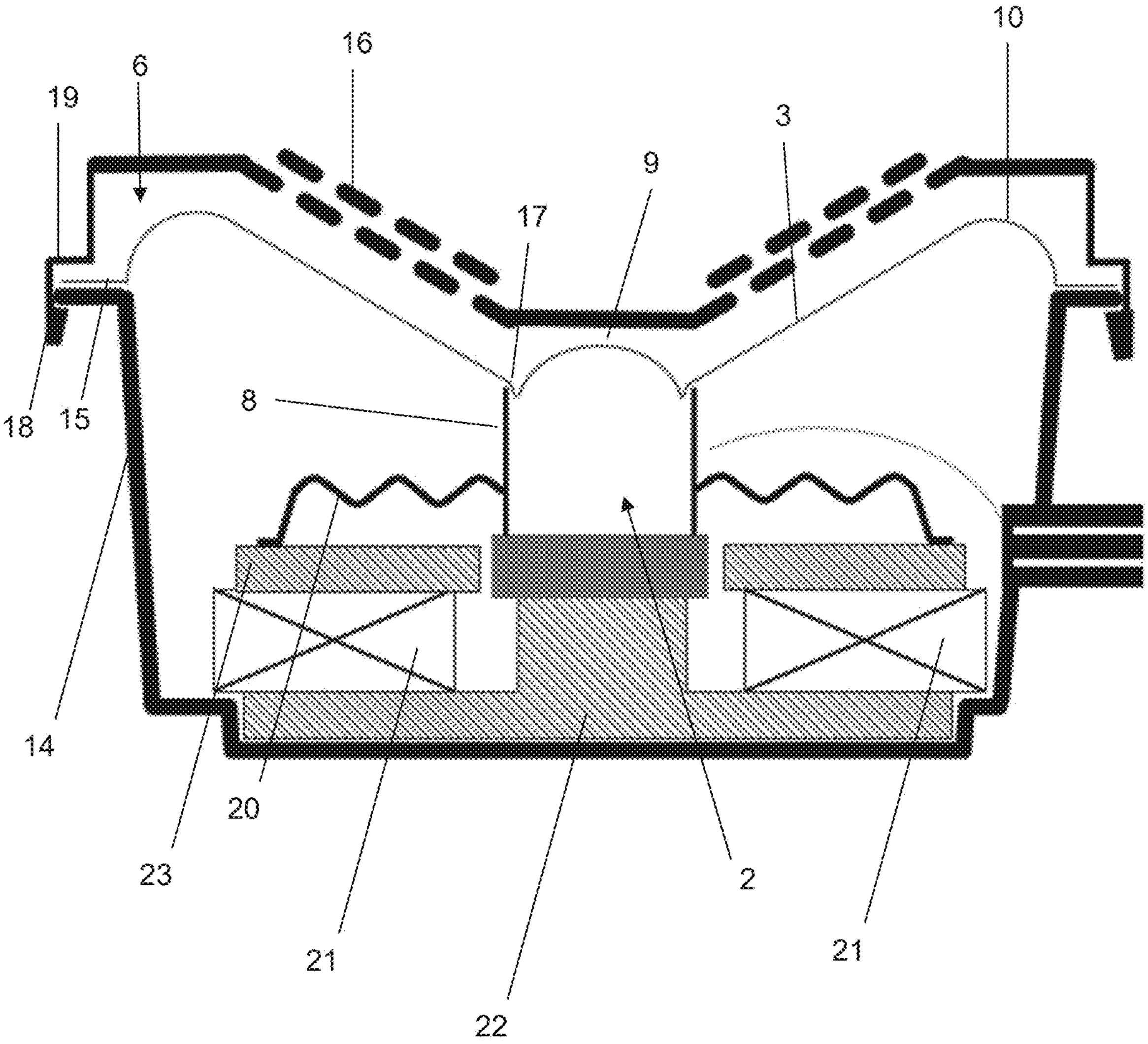
FIG. 7 shows a schematic cross-sectional view of a first loudspeaker assembly according to the present invention.
Figure 8:
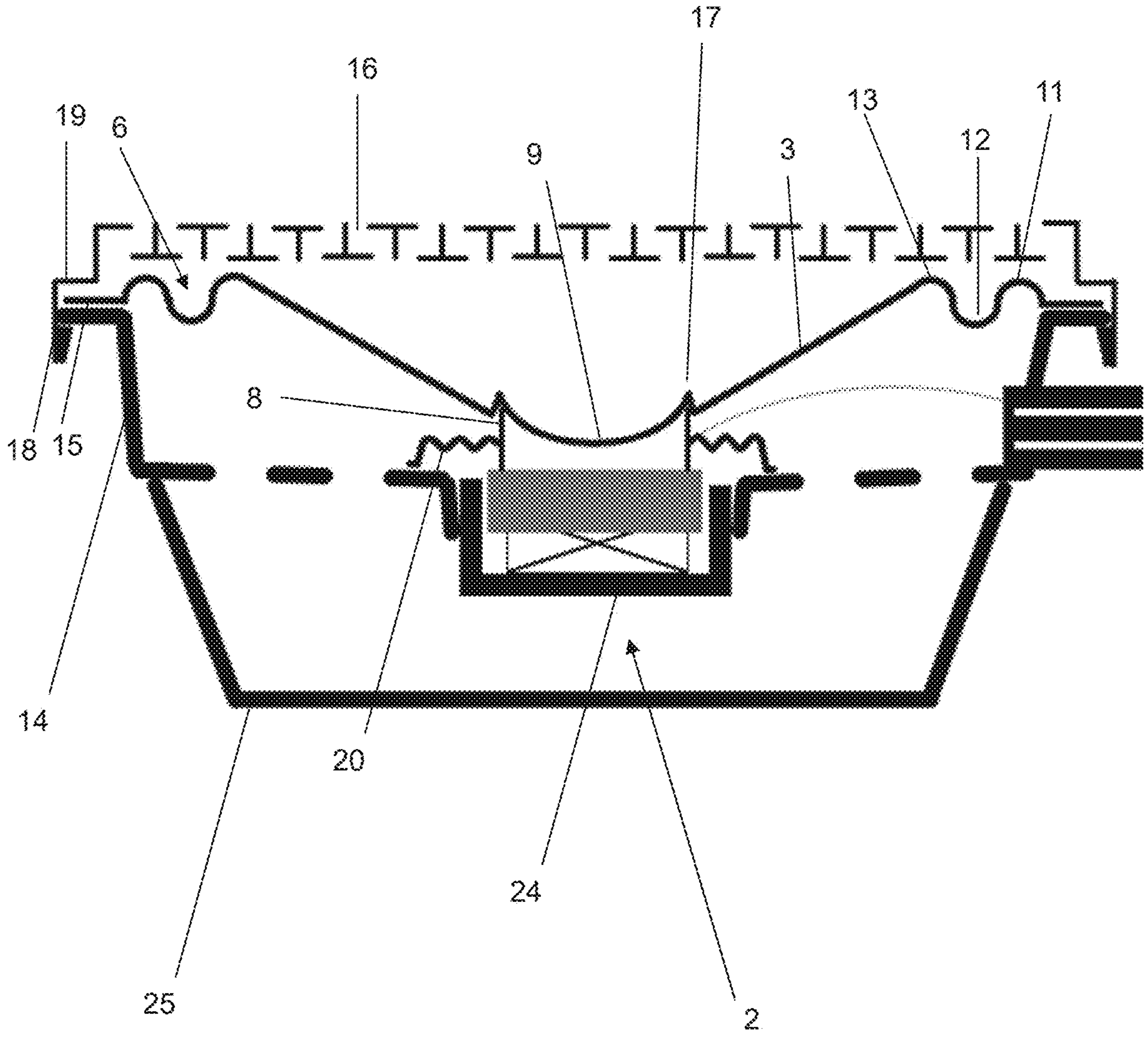
FIG. 8 shows a schematic cross-sectional view of a second loudspeaker assembly according to the present invention.
Figure 9:
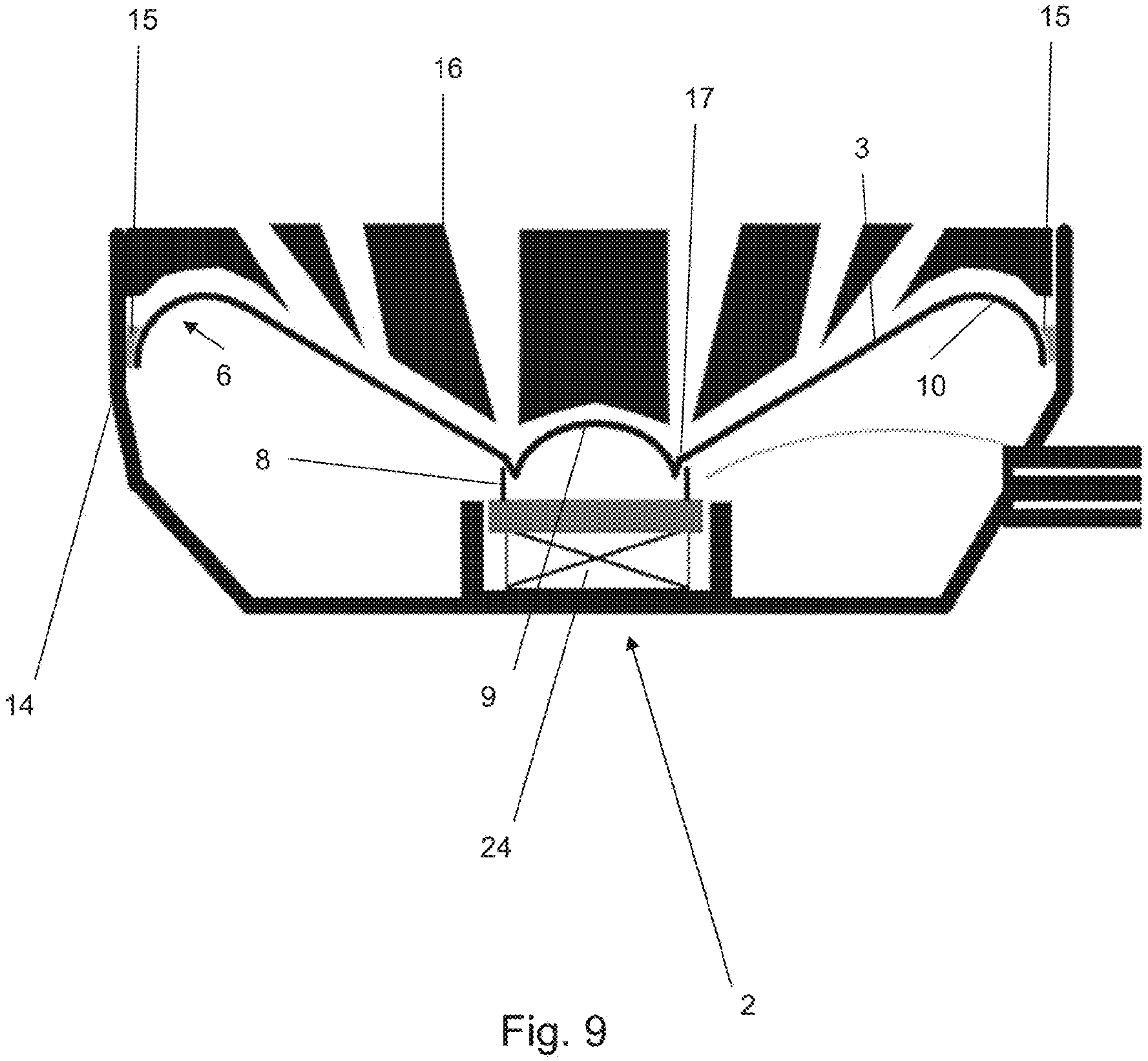
FIG. 9 shows a schematic cross-sectional view of a third loudspeaker assembly according to the present invention.

Further embodiments of speakers according to the present invention are illustrated in FIGS. 7-9. Similar parts to those illustrated in FIG. 1 are given the same reference numeral.

FIG. 7 shows an embodiment wherein the suspension 6 is again includes a surround 7 having a corrugation 10, The surround 7 is attached to a frame 14 by the mounting portion 15, which is formed as a flat annular portion circumferentially outside the corrugation 10. The corrugation 10 is a curved portion of the material, effectively convex with respect to the forward direction 5 illustrated in FIG. 1; that is, the extended part of the curve extends in the forward direction 5.

The mounting portion 15 may be, for example, stuck to a ledge or platform part of the frame 14 by an adhesive. Alternatively it may be secured between the ledge/platform part 18 and a lid 19 of the unit. Such a mechanical clamping may be used in combination with an adhesive to fix the mounting portion 15 and hence the surround 7.

The lid 19 can include a grille 16 for protecting the speaker assembly, for example protection from moisture ingress to permit outside usage.

In this embodiment, the voice coil 8 is suspended by a spider 20 which holds the voice coil within the frame. To work effectively there is not contact between the voice coil and the frame. The spider is sufficiently resilient to hold the voice coil by withstanding the forces that are generated when a current is passed through the voice coil. The spider also suspends the voice coil former and stops it form coming into contact with any other part of the loudspeaker when it is oscillating, or from touching any part of the loudspeaker when it is not oscillating.

The attachment of the diaphragm 3 to the frame 14 may be, as mentioned above, by a first mechanical clamp formed by a ledge or platform piece 18 of the frame 14 and a corresponding lip of the lid 19. To ensure the connection between the diaphragm and frame is flexible whilst being securely connected to the frame, there is provided the suspension 6 which has a surround 7, linking the diaphragm 3 to the mounting portion 15. This is attached to the diaphragm 3 at an internal end of the suspension 6 and to the mounting portion 15 at the outer end; that mounting portion 15 is held by the first mechanical clamp at its own outer end. This leads to a clamped boundary condition. The mounting portion 15, surround 7 and diaphragm 3 are all formed integrally of a single piece of material. The surround 7 can present as a corrugation or curved portion 10 at the outer periphery of the diaphragm portion 3; the mounting portion 15 can present as an annular flange at the outer periphery of the surround portion 7.

The properties of that material are discussed in detail herein. The material must have a certain thickness and Young's modulus, while the diaphragm has a certain size, to give the desired motion and hence acoustic response characteristics. For example, the material used in an embodiment such as that illustrated in FIG. 7 may be a glass fiber/epoxy resin composite material with a thickness of 0.08 mm.

The motor or drive system 2 in the illustrated embodiment utilises a ring magnet 21 to provide a magnetic field for movement of the voice coil 8; the magnet system is connected to the rear of the frame 14 by a yoke 22. The spider is connected to a 'washer' part 23 of the magnet system. It will be recognised that such a drive system can be applied to a wide variety of different diaphragm/suspension/frame designs and configurations beyond those illustrated in FIG. 7.

The same is true of the grille 16 illustrated as part of the lid 19. As illustrated the grille follows the shape of the diaphragm and is therefore in the shape of a truncated cone (frustoconical). It has a flat portion corresponding to the location of the dust cap 9 and an angled portion corresponding to the location of the diaphragm 3. The grille 16 protects the diaphragm 3 and other internal workings from environmental factors; here, there is no 'line of sight' through the grille from outside to the diaphragm. By presenting such a 'tortuous path' for water droplets etc. the grille provides effective protection from water or debris.

By contrast, the grille illustrated in FIG. 8 is flat across the 'top' of the frame 14. In this embodiment, the suspension 6 has a surround 7 including three corrugations, 11, 12 and 13, in place of the single corrugation 10 illustrated in FIG. 7. This arrangement features a corrugation 13 which is circumferentially outward of the diaphragm 3; that corrugation is 'convex' in that it curves outwards from the frame towards the frontwards direction 5 (not illustrated). The next corrugation 12 is circumferentially outwards of the corrugation 13; it is convex in that it curves inwards towards the frame, away from the frontwards direction 5. This is followed in the circumferentially outward direction by a further corrugation 11, which is again convex. Outward of that is the mounting portion 15, a flanged portion equivalent to that illustrated and described earlier.

Such a suspension arrangement can provide further flexibility to the surround 7; this may mean that different material properties can be exploited.

It can be seen that the dust cap 9 in this embodiment is 'inverted' as compared to that illustrated in FIG. 7. That is, rather than being convex and extending into the cone of the diaphragm, it is concave, being bounded by a separating wall from which it extends on a circumferentially inner side. The junction between the surrounding wall and the diaphragm 3 provides a portion 17 in the form of an annular notch or ridge into which the voice coil 8 can be seated.

The drive system 2 illustrated for this embodiment utilises a disc magnet 24. It is mounted to the frame 14; in this instance, the frame 14 is itself mounted to a rear part 25 forming a cabinet (as is the spider 20). The rear part 25 can be attached to the frame by any means, such as an adhesive or mechanical bonding such as screw fixtures.

A third example embodiment is illustrated in FIG. 9. The drive system here is comparable to that of FIG. 8, with a disc magnet 24 mounted within the frame 14 (no rear part 25 is present in this embodiment). This is fixed to the rear wall of the frame 14; no spider is present in this embodiment.

The dust cap 9 is much as illustrated and explained for FIG. 7; a similar notch 17 is present to seat the voice coil 8.

The grille 16 in this embodiment is configured to boost a particular frequency range.

The attachment of the surround 7 (having corrugation 10) to the frame 14 is different in this embodiment. There is no mounting portion 15 provided here. Instead, the outer part of the corrugation 10 is 'wedged' into the frame 14. Between the corrugation 10 (that is, the surround 7) and the inner wall of the frame 14 there is sandwiched one or more fixing members 15. The fixing members are sized to prevent movement of the outermost edge of the surround 7; thus again giving a clamped boundary condition. The fixing member(s) may be formed of a solid material or may be themselves adhesive to stick the surround in place. There may be a single fixing member 15 extending around the entire perimeter of the surround 7; alternatively, there may for example be four such members 15 positioned around the perimeter. Ideally a single fixing member extends around the entire perimeter to give the best mechanical clamping.

The material of the diaphragm, surround and dust cap in this embodiment is epoxy coated glass fiber with a thickness of 0.15 mm.

Figure 4:
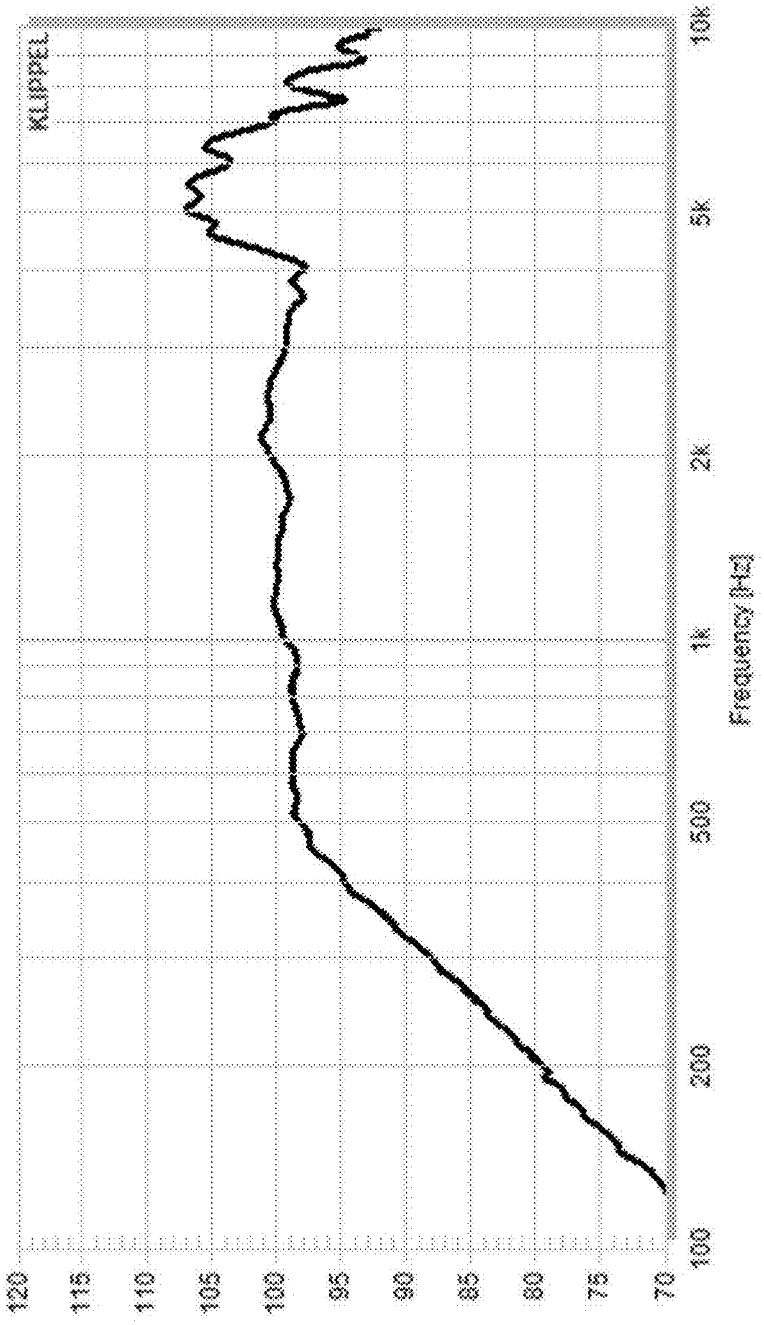
FIG. 4 shows an example output spectrum from a loudspeaker assembly of the present invention, at 2V on axis in infinite baffle, without a grille.
Figure 5:
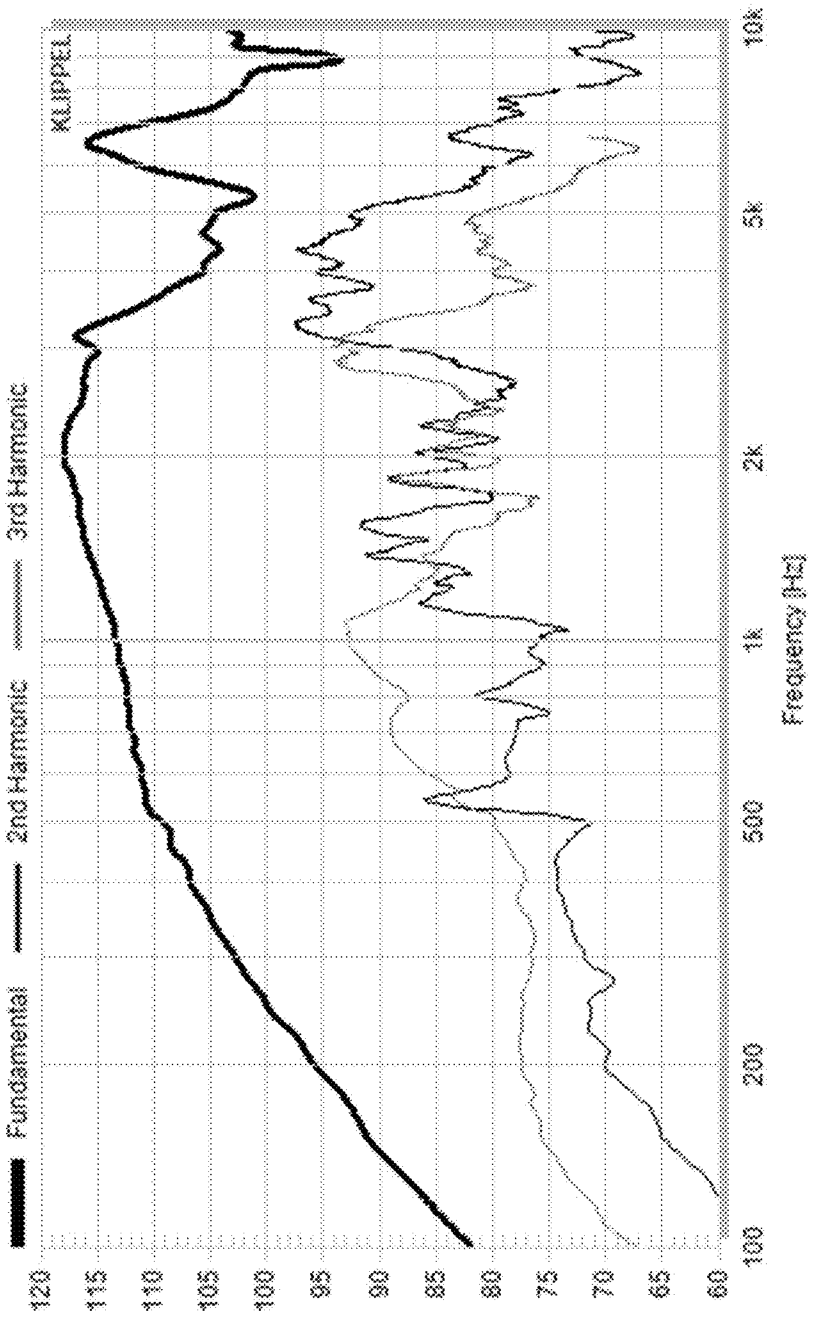
FIG. 5 shows an example output spectrum from a loudspeaker assembly of the present invention, at 8.5V on axis in infinite baffle, with a grille.
Figure 6:
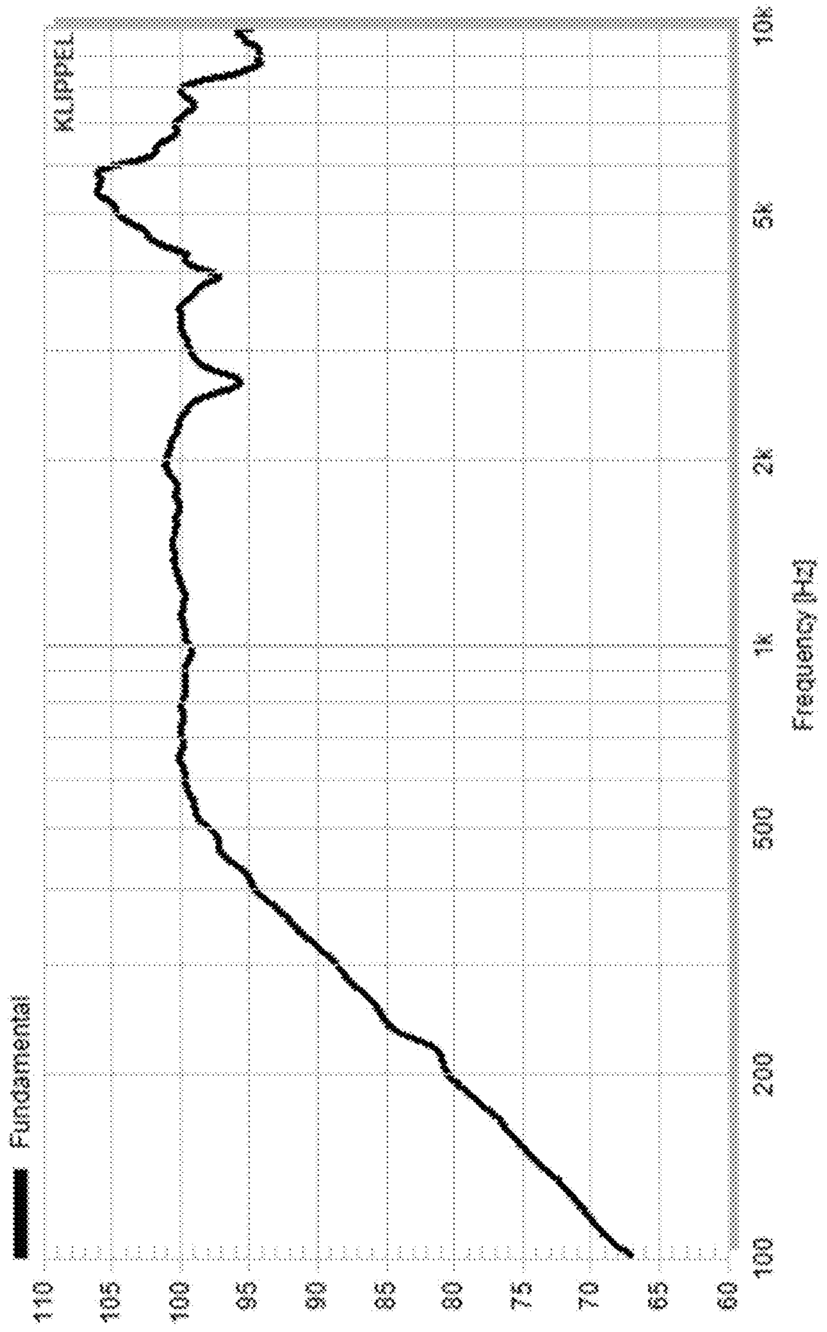
FIG. 6 shows an example output spectrum from a loudspeaker assembly of the present invention, at 2V on axis in infinite baffle, without a grille.

In order to test the response of the present speakers, output spectra shown in FIGS. 4, 5 and 6 were generated.

FIG. 4 shows an example frequency response from a loudspeaker assembly of the present invention having a 0.15 mm thick material forming the diaphragm, surround and dust cap, made from glass fiber and epoxy resin, at 2V on axis in infinite baffle, without a grille. It can be seen that despite the high resonance frequency of speakers of the present invention, the output at lower frequencies such as the 315 Hz ⅓$^{rd}$ octave band is still substantial (approximately 87 dB) due to the high loudspeaker sensitivity.

FIG. 5 shows an example frequency response and 2$^{nd}$ and 3$^{rd}$ order distortion components from a loudspeaker assembly of the present invention having a 0.15 mm thick material forming the diaphragm, surround and dust cap, made from glass fiber and epoxy resin, at 8.5V on axis in infinite baffle, with a grille. These Figures show that even at 8.5V the harmonic distortion remains moderate for low frequencies.

This allows the present loudspeakers to be used not only as vehicle warning horns but also as AVAS loudspeakers having to reproduce frequencies below its resonance frequency.

FIG. 6 shows an example frequency response from a loudspeaker assembly of the present invention with a 0.08 mm thick material forming the diaphragm, surround and dust cap, made from Kevlar dipped in phenolic resin, at 2V on axis in infinite baffle, without a grille. Despite the very thin membrane material the frequency response is substantially smooth within the decade ranging from 500 Hz to 5 kHz.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A loudspeaker assembly for use on the outside of a vehicle, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis;

wherein the loudspeaker assembly includes a frame from which the diaphragm is suspended by at least one suspension;

wherein the diaphragm includes a cone-shaped portion which is substantially in the shape of an open cone and has a cone opening angle in the range 90° to 130°;

wherein the at least one suspension includes a surround which is located at the perimeter of the diaphragm, wherein the surround comprises a single corrugation which extends around the perimeter of the diaphragm, wherein the single corrugation is convex with respect to the forward direction, wherein the corrugation has a curved cross section in a section parallel to the movement axis and is tangentially connected to the diaphragm;

wherein the diaphragm and surround are formed of a single piece of material, the material comprising a single layer woven fabric of orthogonal, woven fibers and a thermoset resin and the material having a Young's modulus in the range 2 GPa to 15 GPa as measured in at least one direction; and wherein the loudspeaker assembly is configured to produce a combined A-weighted sound pressure level in the ⅓$^{rd}$ octave frequency bands 2 kHz, 2.5 kHz, and 3.15 kHz that is no less than 105 dB measured under anechoic conditions at a 2 m distance on the principal axis of the loudspeaker assembly.

2. A loudspeaker assembly according to claim 1, wherein the longest dimension of the surround and diaphragm unit in a direction perpendicular to the movement axis is D_clamp and is in the range 50 to 200 mm.

3. A loudspeaker assembly according to claim 1, wherein the material of the diaphragm and the surround has a Young's modulus in the warp/weft direction in the range 2 to 15 GPa and a Young's modulus at 45° to the warp/weft direction in the range 2 to 10 GPa;

and wherein the thickness of the material of the diaphragm and the surround is in the range 0.03 to 1 mm.

4. A loudspeaker assembly according to claim 1, wherein the material of the diaphragm and the surround has a tensile strength in the warp/weft direction in the range 75 to 300 MPa and a tensile strength at 45° to the warp/weft direction in the range 50 to 200 MPa.

5. A loudspeaker assembly according to claim 1, wherein the drive unit comprises a voice coil positioned at the tip of the open cone of the cone-shaped portion, and having a longest dimension D_VC in a direction perpendicular to the movement axis, wherein D_VC is in the range 18 to 50 mm and wherein the longest dimension of the surround and diaphragm unit in a direction perpendicular to the movement axis is D_clamp and the ratio of D_clamp to D_VC is 2 or more.

6. A loudspeaker assembly according to claim 5, wherein the diaphragm has a shaped portion which is adapted to engage the voice coil.

7. A loudspeaker assembly according to claim 1, wherein the diaphragm further comprises a dust cap portion on the front face of the diaphragm covering the tip of the open cone of the cone-shaped portion.

8. A loudspeaker assembly according to claim 1, wherein the surround has a longest dimension D_d in a direction perpendicular to the movement axis measured between points at the peak of the corrugation in the forwards direction, wherein the longest dimension of the surround and diaphragm unit in a direction perpendicular to the movement axis is D_clamp, and wherein the ratio of D_d to D_clamp is 0.8 or more.

9. A loudspeaker according to claim 8, wherein the curve of the curved cross section is a section of a circle.

10. A loudspeaker assembly according to claim 1, wherein the surround includes a mounting portion at the perimeter of the surround, wherein the surround is attached to the frame via the mounting portion.

11. A loudspeaker assembly according to claim 1, comprising a fixing member positioned between the surround and the frame and sized to fix the loudspeaker within the frame.

12. A loudspeaker assembly according to claim 1, further comprising a grille positioned in front of the front face of the diaphragm, with a rear face of the grille facing in the rearwards direction toward the front face of the diaphragm, and with a front face of the grille facing in the forwards direction;

wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the diaphragm.

13. A loudspeaker assembly according to claim 12, which is configured for use in a road vehicle with the front face of the grille exposed to an outdoor environment.

14. An Acoustic Vehicle Alerting System (AVAS) comprising a loudspeaker assembly according to claim 1.

15. An Audible Warning Device comprising a loudspeaker assembly according to claim 1.

16. A loudspeaker assembly according to claim 1, wherein the material has a Young's modulus in the range 8 GPa to 15 GPa as measured in at least one direction.

17. A loudspeaker assembly according to claim 1, wherein the loudspeaker assembly is configured to produce a substantially smooth frequency response in a frequency range of 350 Hz to 3.5 kHz with a maximum displacement of the diaphragm being at most 1 mm from its resting position.

18. A loudspeaker assembly according to claim 1, wherein the maximum displacement of the diaphragm is at most 1 mm from its resting position.

19. A loudspeaker assembly for use on the outside of a vehicle, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis;

wherein the loudspeaker assembly includes a frame from which the diaphragm is suspended by at least one suspension;

wherein the diaphragm includes a cone-shaped portion which is substantially in the shape of an open cone and has a cone opening angle in the range 90° to 130°;

wherein the at least one suspension includes a surround which is located at the perimeter of the diaphragm, wherein the surround comprises a single corrugation which extends around the perimeter of the diaphragm, wherein the single corrugation is convex with respect to the forward direction, wherein the corrugation has a curved cross section in a section parallel to the movement axis and is tangentially connected to the diaphragm;

wherein the diaphragm and surround are formed of a single piece of material, the material comprising a single layer woven fabric of orthogonal, woven fibers and a thermoset resin and the material having a Young's modulus in the range 2 GPa to 15 GPa as measured in at least one direction; and wherein the loudspeaker assembly is configured to produce a substantially smooth frequency response in a frequency range of 350 Hz to 3.5 kHz with a maximum displacement of the diaphragm being at most 1 mm from its resting position.

* * * * *